US012769281B2

(12) United States Patent
Bade et al.

(10) Patent No.: US 12,769,281 B2
(45) Date of Patent: Oct. 20, 2026

(54) NETWORK-BASED SPRAY PHYSICAL APPLICATION EQUIPMENT MONITORING AND MANAGEMENT

(71) Applicant: Spraying Systems Co., Wheaton, IL (US)

(72) Inventors: Kyle M. Bade, Rockford, MI (US); Rudolf J. Schick, Forest Park, IL (US)

(73) Assignee: Spraying Systems Co., Wheaton, IL (US)

(*) Notice: Subject to any disclaimer, the term of this patent is extended or adjusted under 35 U.S.C. 154(b) by 833 days.

(21) Appl. No.: 17/711,360

(22) Filed: Apr. 1, 2022

(65) Prior Publication Data

US 2022/0326687 A1 Oct. 13, 2022

Related U.S. Application Data

(60) Provisional application No. 63/172,826, filed on Apr. 9, 2021.

(51) Int. Cl.

*G05B 19/4155* (2006.01)
*G06T 3/40* (2024.01)
*G06T 5/80* (2024.01)
*H04N 7/18* (2006.01)
*H04N 23/56* (2023.01)

(52) U.S. Cl.

CPC ............ *G05B 19/4155* (2013.01); *G06T 3/40* (2013.01); *G06T 5/80* (2024.01); *H04N 7/183* (2013.01); *H04N 23/56* (2023.01); *G05B 2219/45013* (2013.01)

(58) Field of Classification Search

CPC ...... G05B 19/4155; G05B 2219/45013; G06T 3/40; G06T 5/80; H04N 7/183; H04N 23/56; B05B 12/082

See application file for complete search history.

(56) References Cited

U.S. PATENT DOCUMENTS

| | | | | |
|---|---|---|---|---|
| 9,964,495 | B1 | 5/2018 | Marshall et al. | |
| 10,255,670 | B1 * | 4/2019 | Wu | H04N 7/183 |
| 11,766,160 | B2 * | 9/2023 | Fawaz | A47L 15/4282 134/56 D |

(Continued)

OTHER PUBLICATIONS

International Bureau, International Search Report in International Application No. PCT/US2022/023083, mailed Jul. 18, 2022.

*Primary Examiner* — Robert E Fennema
*Assistant Examiner* — Marzia T Monty
(74) *Attorney, Agent, or Firm* — Leydig, Voit & Mayer, Ltd.

(57) ABSTRACT

A networked spray application management arrangement is described herein. The spray application management arrangement includes a spray scan data server and a spray application. The spray scan application, in turn, includes: a spray nozzle monitoring apparatus that renders a process variable data indicative of a current status of a spray nozzle system; and a first network interface that sends a message comprising a data payload comprising information corresponding to the process variable data to the spray scan data server. The spray scan data server includes: a second network interface for receiving the message; a spray scan database for storing the information corresponding to the process variable data; and a spray scan data analysis engine.

16 Claims, 19 Drawing Sheets

(56) References Cited

U.S. PATENT DOCUMENTS

| | | | |
|---|---|---|---|
| 2009/0109232 | A1 | 4/2009 | Kerofsky |
| 2012/0105628 | A1* | 5/2012 | Fukuchi .................. G01P 5/001 348/135 |
| 2016/0006860 | A1 | 1/2016 | Neitzel et al. |
| 2019/0047009 | A1 | 2/2019 | Barker et al. |
| 2020/0060347 | A1* | 2/2020 | Kersey .................... H04W 4/80 |

* cited by examiner

NETWORK-BASED SPRAY PHYSICAL APPLICATION EQUIPMENT MONITORING AND MANAGEMENT

CROSS-REFERENCE TO RELATED APPLICATIONS

This patent application claims the benefit of U.S. Provisional Patent Application No. 63/172,826, filed Apr. 9, 2021, entitled "NETWORK-BASED SPRAY APPLICATION MONITORING AND MANAGEMENT", which is expressly incorporated herein by reference in its entirety, including any references therein.

This application relates to U.S. Non-provisional application Ser. No. 16/864,969, filed May 1, 2020, entitled "OPTICAL SPRAY PATTERN IMAGING APPARATUS FOR GENERATING IMAGES INCLUDING DENSITY IMAGE FEATURES," which is a non-provisional of U.S. Provisional Application Ser. No. 62/842,964, filed May 3, 2019, entitled "OPTICAL SPRAY PATTERN IMAGING APPARATUS FOR GENERATING IMAGES INCLUDING DENSITY IMAGE FEATURES," the contents of each of which are expressly incorporated herein by reference in their entirety, including any references therein.

TECHNICAL FIELD

The present invention relates generally to spray pattern imaging apparatuses, and more particularly, to networked systems that integrate and interact with a plurality of networked spray pattern data acquisition apparatuses for acquiring and processing one or more spray pattern images to render a spray pattern for testing, analysis, and remediation of spraying apparatuses employed in a variety of spray applications having a variety of combinations of spray nozzle and sprayed material.

BACKGROUND

Spraying applications are characterized by a combination of spray nozzle configuration and sprayed material specification. The spray nozzle configuration comprises one or more spray nozzles configured in a three-dimensional space—including both distance and direction characteristics. The sprayed material specification comprises one or more sprayed materials (mixed at particular ratios) having particular fluid characteristics—including viscosity, surface tension, volatility, etc.).

Users of such systems have a strong interest in ensuring that a particular spraying application will provide a particular desired coverage—e.g., both complete coverage and even distribution of a particular desired amount. Highly complex systems provide such information using high precision measuring devices that carry out testing and/or optimization offline and in a controlled setting. Such systems are both extremely expensive and require complex testing procedures that may take days or even weeks to complete. While such known systems are highly desireable, their cost and complexity may preclude their use a vast number of spraying applications that require field configuration—literally in a farm field, in a factory/production plant, in a shop, etc.

SUMMARY

The present disclosure provides a spray application management arrangement that includes a spray scan data server and a spray application. The spray scan application, in turn, includes: a spray nozzle monitoring apparatus that renders a process variable data indicative of a current status of a spray nozzle system; and a first network interface that sends a message comprising a data payload comprising information corresponding to the process variable data to the spray scan data server. The spray scan data server includes: a second network interface for receiving the message; a spray scan database for storing the information corresponding to the process variable data; and a spray scan data analysis engine.

The present disclosure furthermore provides a spray scan data server configured to manage information corresponding to a process variable data rendered by a spray nozzle monitoring apparatus of a spray application that comprises a spray nozzle monitoring apparatus that renders the process variable data indicative of a current status of a spray nozzle system and a first network interface that sends a message having a data payload including the information corresponding to the process variable data. The spray scan data server includes: a second network interface for receiving the message; a spray scan database for storing the information corresponding to the process variable data; and a spray scan data analysis engine.

Moreover, the present disclosure is directed to a method, carried out by a spray scan data server configured to manage information corresponding to a process variable data rendered by a spray nozzle monitoring apparatus of a spray application that comprises a spray nozzle monitoring apparatus that renders the process variable data indicative of a current status of a spray nozzle system and a first network interface that sends a message having a data payload including the information corresponding to the process variable data. The method includes: receiving the message via a second network interface; storing, in a spray scan database, the information corresponding to the process variable data; and rendering, by a spray scan data analysis engine, analytical data corresponding to the information corresponding to the process variable data rendered by the spray nozzle monitoring apparatus.

Figure 1A:
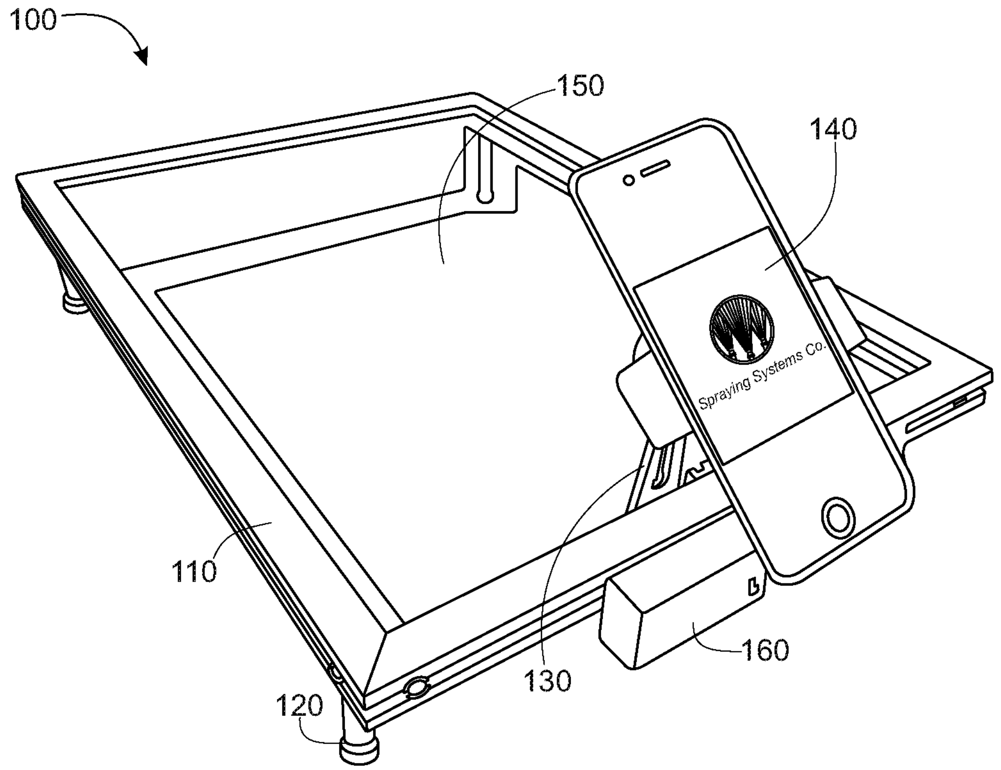
FIGS. 1A and 1B provide perspective views of two illustrative examples of a system embodying the current invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF EMBODIMENTS

Illustrative examples are now described that address the need to provide satisfactorily precise and accurate observations, in the form of a visual image, of spray distribution in the field (as opposed to test labs) and to carry out such observation with momentary feedback to users' adjustments to nozzle configuration and/or sprayed material properties.

Referring to FIG. 1A, an illustrative spray distribution imaging system 100 is depicted. The illustrative system has utility in a wide variety of environments. However, the illustrative examples are particularly useful in the field or in situations where momentary spray pattern feedback to a current spraying application (configuration) is desired by a user. In the illustrative example, the system 100 includes a frame 110. The frame 110 is rectangular in the illustrative example and includes a set of legs (e.g. leg 120) disposed at each corner of the rectangular frame, thus providing a gap between the frame 110 and a surface upon which the system 100 is placed. The known rectangular shape of the frame 110 provides an important feature for normalizing/correcting an initially acquired image. The known aspect of the frame 110 also applies to a known length of the distal edge 112 (or portion thereof) of the frame 110 (or either side edge) that may be used to determine a distance of a feature within the initially acquired image.

Therefore, the known aspect of the frame 110 is not limited to dimensions of a rectangular shaped frame. Illustrative examples of the present disclosure may be any of a variety of shapes and configurations. For example, the frame 110 may be circular in shape. Moreover, any combination of visual features, having known physical dimensions (in a two-dimensional plane), indicated by the frame 110 are contemplated in meeting the "known aspect" of the frame 110. As such, in yet other examples, the frame 110 may have almost any shape as long as there are a set of visual features (e.g. corners, notches, markings) that are visually identifiable in a camera field of view to facilitate, within a captured camerat image, at least: (1) correction of optical distortion (e.g. paralax) and (2) scale (determine two-dimensional sizing of) spray image features. Thus, in accordance with illustrative examples of the frame 110, the relative positions of the visually identifiable markings on the frame in a spray pattern image are used to correct for distortion and determine dimensions of spray pattern features.

Additionally, it is further noted that the frame 110 (with known aspects) need only be present during an initial calibration and/or configuration stage of operation of the system 100. Once a field of view of a camera in relation to an illuminated plane of a spray field of interest is established and fixed, the frame 110 may be withdrawn during subsequent acquisition of spray pattern (illuminated in a plane by LASER light source(s)).

A holder 130, which is optional (as shown in the system depicted in FIG. 1B), is mounted upon the frame 110. The holder 130 includes a grip structure that engages and holds a smart phone 140 (or other digital image acquisition device) in a stable/fixed relation to the frame 110 (i.e. to provide a steady image). In the illustrative example, the holder 130 is adjustable (via linear and pivoting adjustments) to enable positioning and orienting an imaging lens of the smart phone 140 in relation to a plane defined by edges of the frame 110.

Figure 1B:
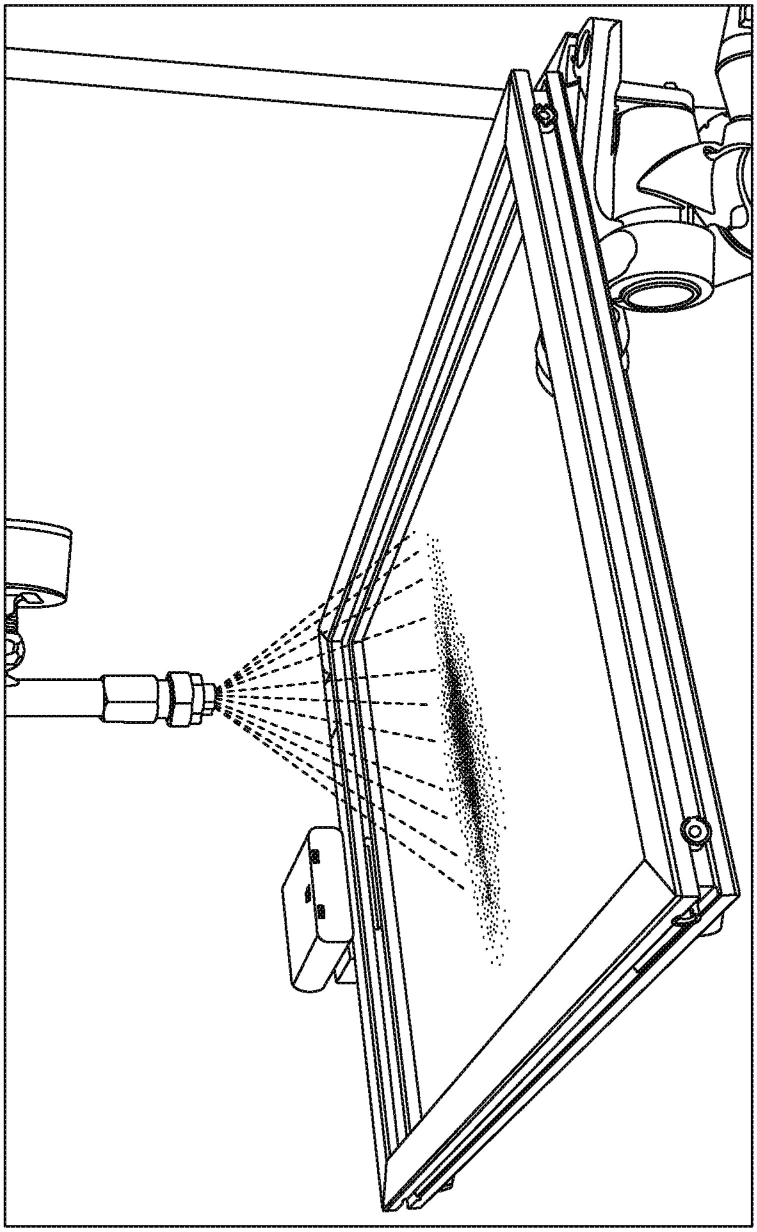

With continued reference to FIGS. 1A and 1B, a planar light source (not shown) emits a planar light pattern 150 in the plane defined by the edges of the frame 110. A battery pack 160 (or any suitable power supply) is provided to power the planar light source. In an illustrative example, the planar light source is provided by passing an output beam of a laser (e.g. a green laser, however other types of laser may also be used) through a diffraction grating to provide a suitably even distribution of light intensity in the planar light pattern 150. The use of a monochromatic (e.g. green) laser as the light source facilitates using the corresponding (green) data element of the initially acquired color image of the spray field to determine a spray density at a particular pixel location in the initially acquired image. A wide variety of planar light sources (not limited to a monochromatic/laser) are contemplated in various examples of the present disclosure.

In cases where a non-uniform distribution cannot be achieved, a suitable compensation factor can be applied to compensate for the variations in intensity. For example, a compensation factor may be applied according to an azimuthal angle from a point of the planar light source.

Moreover, the present disclosure contemplates additional forms of (programmed image processor implemented) compensating for light source effects, including compensating for viewing angle of a camera aperture (receiving the droplet scattered light from the planar light pattern generated by the planar light source) with respect to the source of the planar light pattern. Referring to FIG. 1B, for example, a scattered light intensity correction may be applied to account for a variation of intensity of scattered light received by the camera aperture based upon a relative scattering angle of light across the planar light pattern for a known position of the camera aperture in relation to a direction of the light emitted by the planar light source. By way of illustrative example, in FIG. 1B, a camera aperture is positioned such that a left-side of a wide-angle spray pattern is nearly in-line with rays of laser light emitted by the light source (at the far edge of the frame). On the other hand, the right-side of the wide-angle spray pattern is illuminated by light from the laser that is initially emitted relatively away from the camera. Therefore, a relatively large scattering angle is followed by the light on the right-side of the wide angle spray pattern that is received by the camera aperture.

The camera aperture position effect discussed above, as well as any other light source and/or aperture view effects, may range from negligible to severe depending on the planar light sheet source type (point vs planar), and relative distance from the source to the spray region.

The system 100 includes a programmed processor element that is, for example, incorporated into the smart phone 140—e.g. in the form an "app" program downloaded and maintained/executed on the smart phone 140. The programmed processor element is configured with computer-executable instructions that are executed by a processor of the smartphone to carry out operations of a method that is summarized by way of example in FIG. 7 (described herein below). In other illustrative examples, the programmed processor element is provided in any of a variety of computing devices, including tablet, notebook, and desktop computer systems.

Figure 2A:
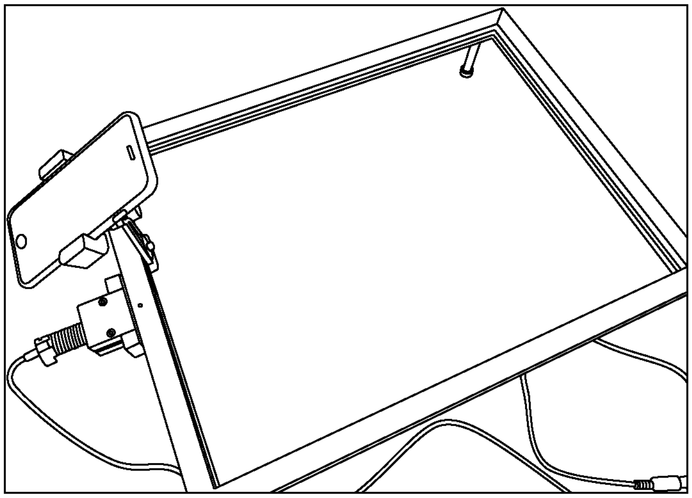
FIGS. 2A, 2B, and 2C are additional views of the systems illustratively depicted in FIGS. 1A and 1B.
Figure 2B:
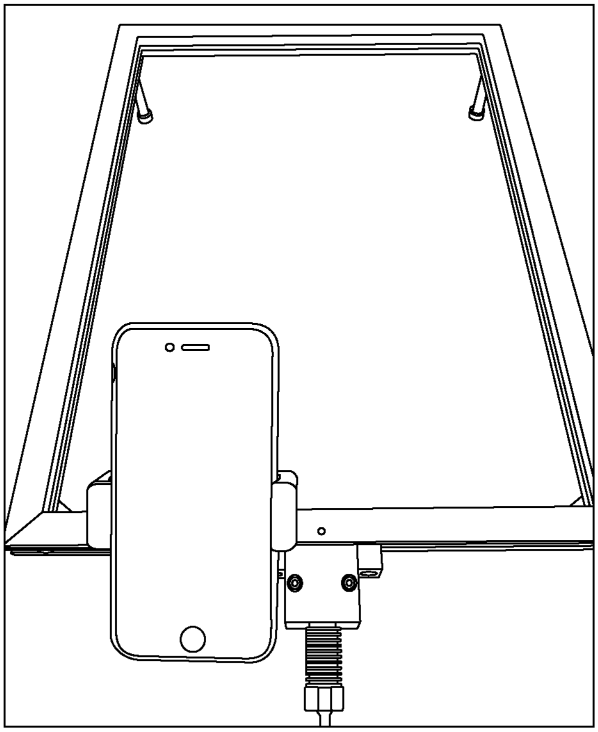

Turning to FIGS. 2A and 2B, two alternative views are provided of the system 100 depicted in FIG. 1A. In these two views, the battery power pack 160 is replaced by a continuous power supply (plugged into the system 100). The structure of the holder 130 (illustrative example) includes a repositionable mounting 170 that facilitates sliding the holder along an edge 180 of the frame 110.

Figure 2C:
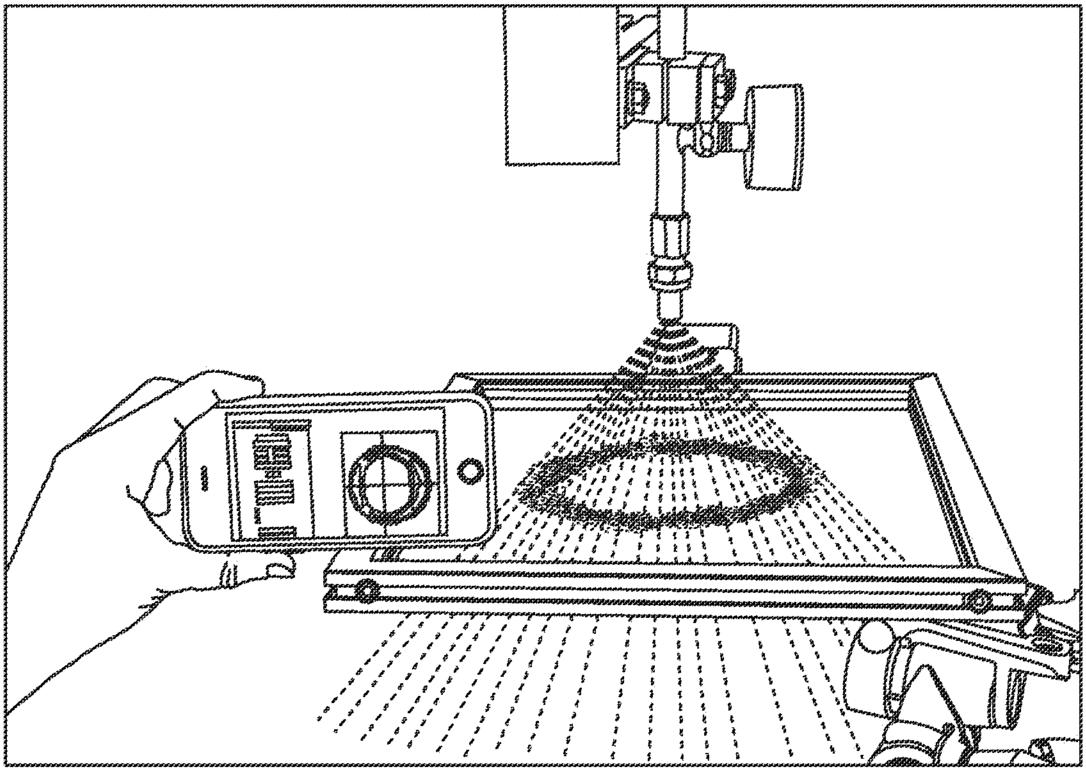

Turning to FIG. 2C an additional view is provided of the system depicted in FIG. 1B that shows a illustrative example of using the system 100 without a fixed holder such as the holder 130 depicted in FIGS. 2A and 2B. This version illustrates the utility of the "known aspects" of the frame 110 that facilitates providing a distortion correction/scaling source for each image—regardless of the position/orientation of the camera that acquires the image. In each captured image, the "known aspect" of the frame (captured within the image containing the captured spray pattern) facilitates performing an image distortion correction and scaling.

Figure 3A:
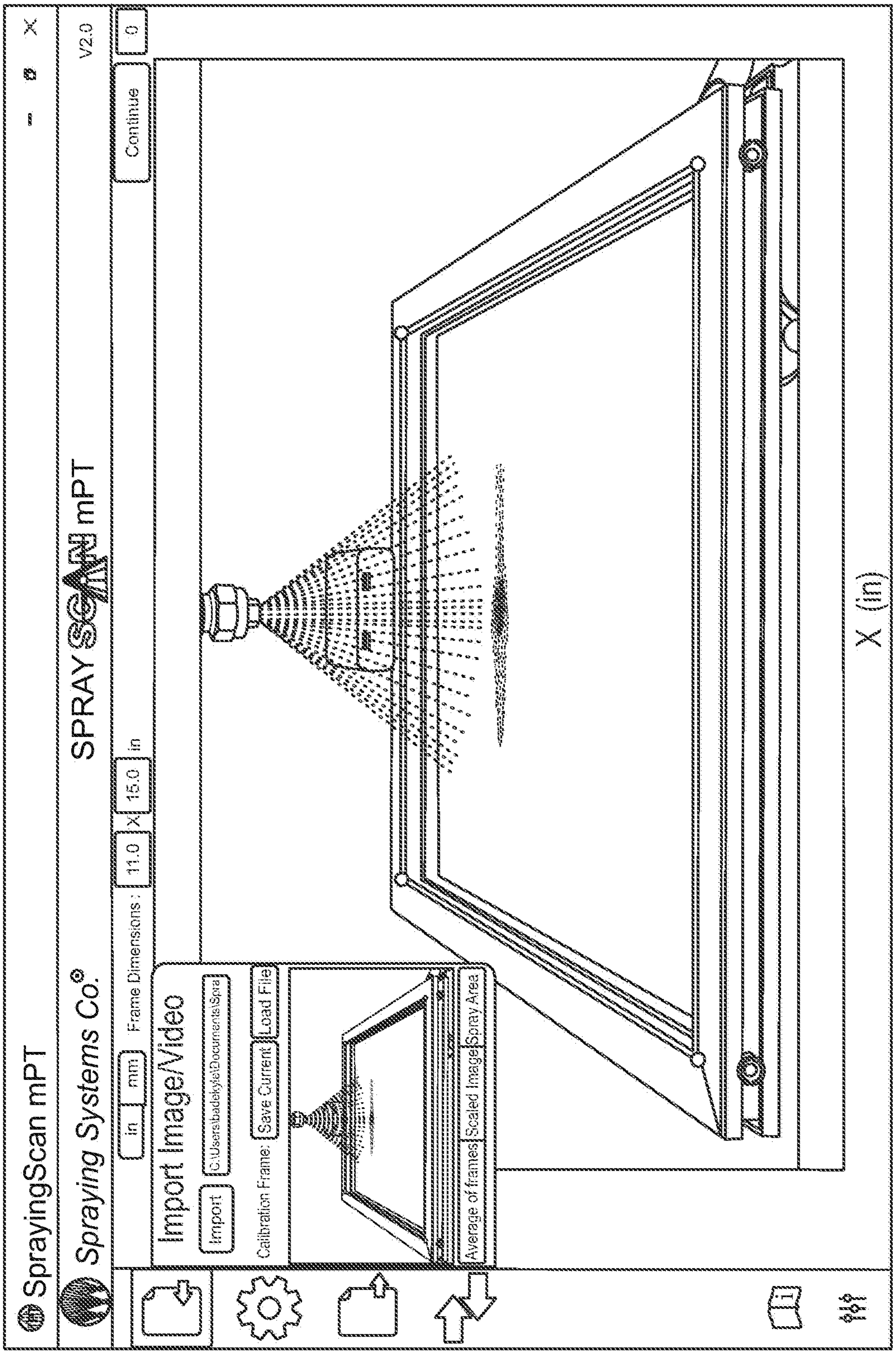
FIGS. 3A, 3B, 3C and 3D depict exemplary user interfaces for importing and selecting an image data (or portion thereof) acquired by an image acquisition device of the system depicted in FIGS. 1 and 2.
Figure 3B:
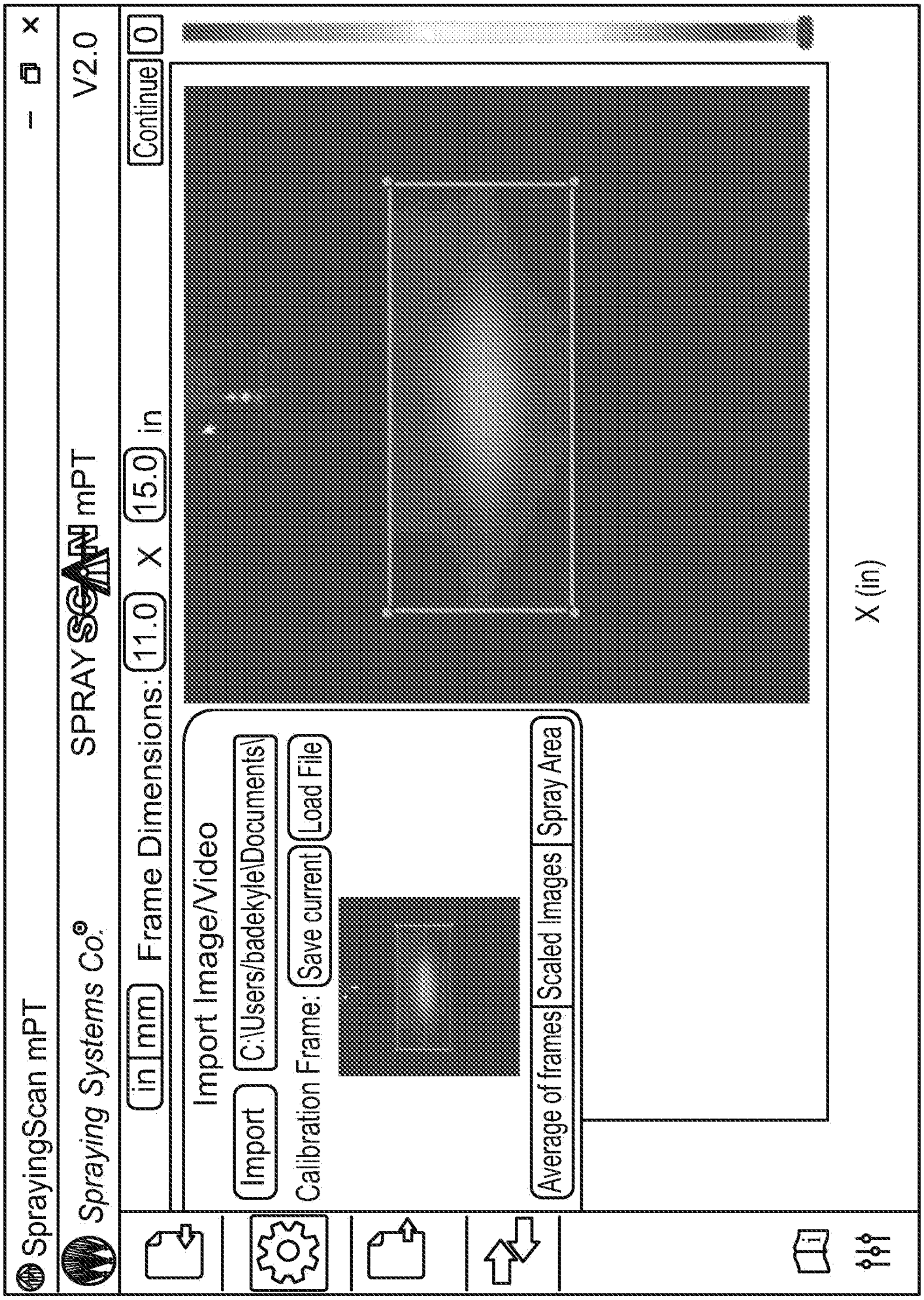

Turning to FIGS. 3A and 3B, two exemplary views of a captured spray image (displayed on an exemplary user interface) are provided. In the view provided in FIG. 3A, a captured spray image is displayed on a user interface that simultaneously displays the "known aspects" (i.e. a width of 11 inches and a length of 15 images) of the frame 110. The positions of the corners of the frame 110 and the known dimensions and shape of the frame 110 are used to correct image distortion and to scale the captured spray pattern within an imaging plane (defined by a planar light source generated in a substantially same plane as a plane defined by the frame 110. In FIG. 3B, the spray has been spatially corrected for distortion arising from the camera view angle.

Figure 3C:
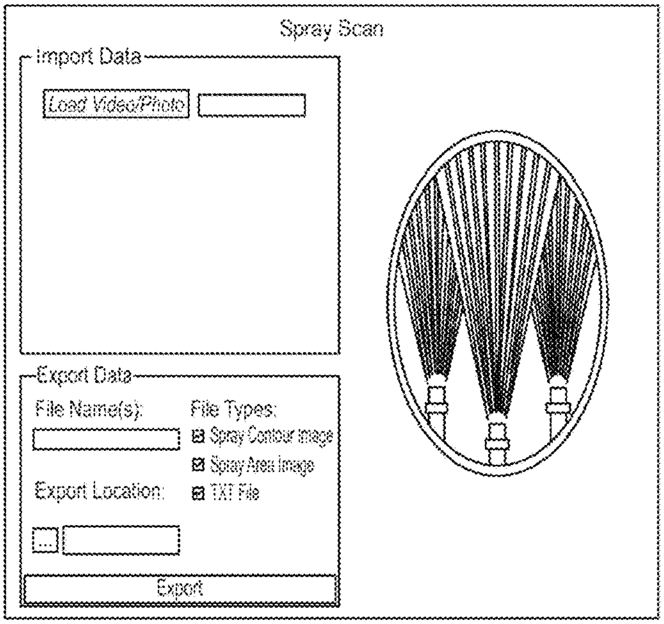
Figure 3D:
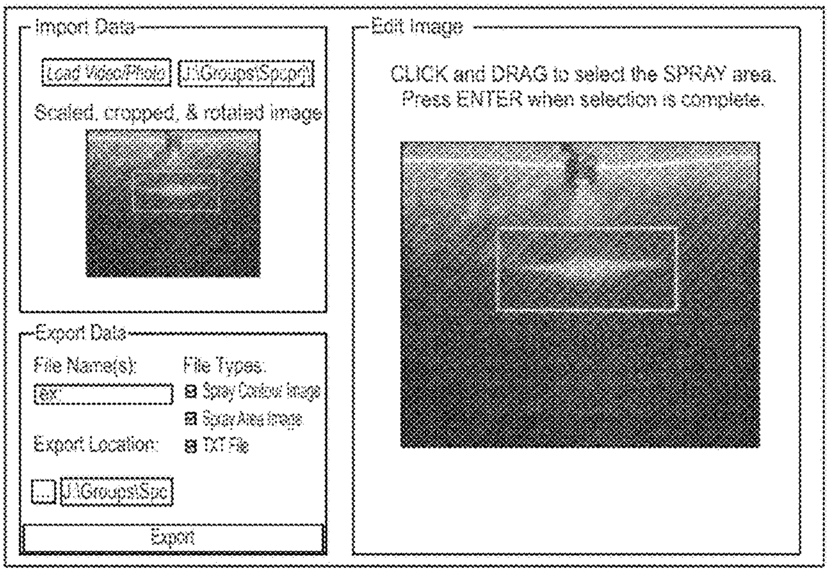

Turning to FIGS. 3C and 3D, an exemplary set of user interfaces, supported by the above mentioned app on the smart phone 140, enable a user to select a portion of a previously acquired image, which may be any type of image including both single static image (jpeg) frame, movie (mpeg) frame, time-lapse sequential image frame sets—such as those now supported by a "live" photo option on smart phones that acquire/store multiple sequential images in response to a single user "click" of a view. In the illustrative view, an import data field supports user selection of an image file for processing/viewing and designating an export data destination for the data. Additionally, an edit image field includes an image display sub-region and controls that enable a user to select a portion of a displayed image frame that will be the subject of further processing and/or storing. In the illustrative example, a control enables a user to "frame" the rectangle area of interest in the source image—for subsequent processing/saving by the system 100.

The system 100 supports acquiring, processing a variety of image data sources captured by a variety of camera types. In addition to static images, the system 100 contemplated acquiring, processing and displaying live (i.e. substantially real time) video. As such a wide variety of types of image/images generated by the system 100 are contemplated in accordance with various illustrative examples described herein.

Figure 4A:
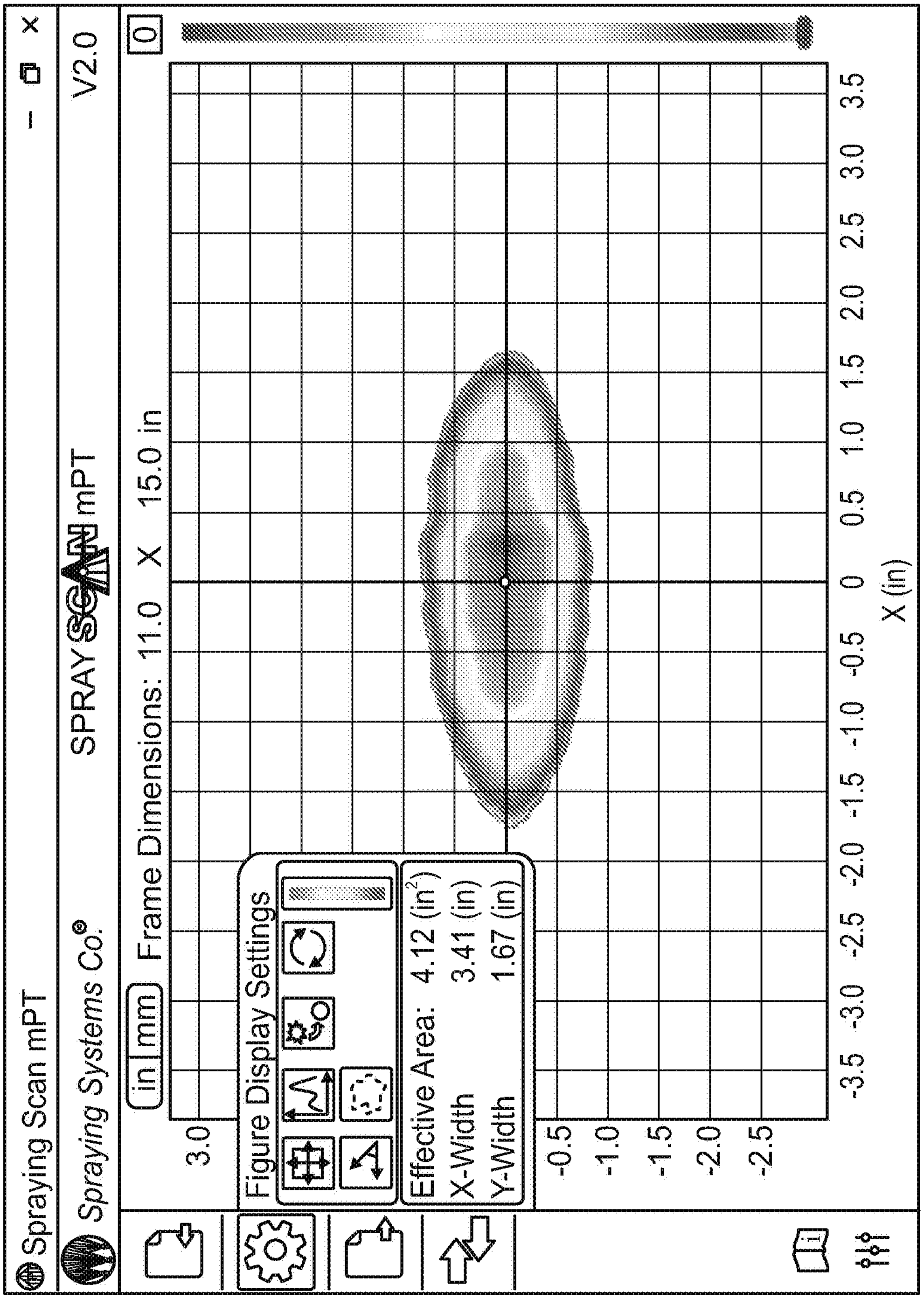
FIGS. 4A and 4B are illustrative grey scale images (from a colorized original) depicting both an extent and a density of a spray pattern, rendered from data acquired by the system depicted in FIGS. 1A, 1B, 2A and 2B.
Figure 4B:
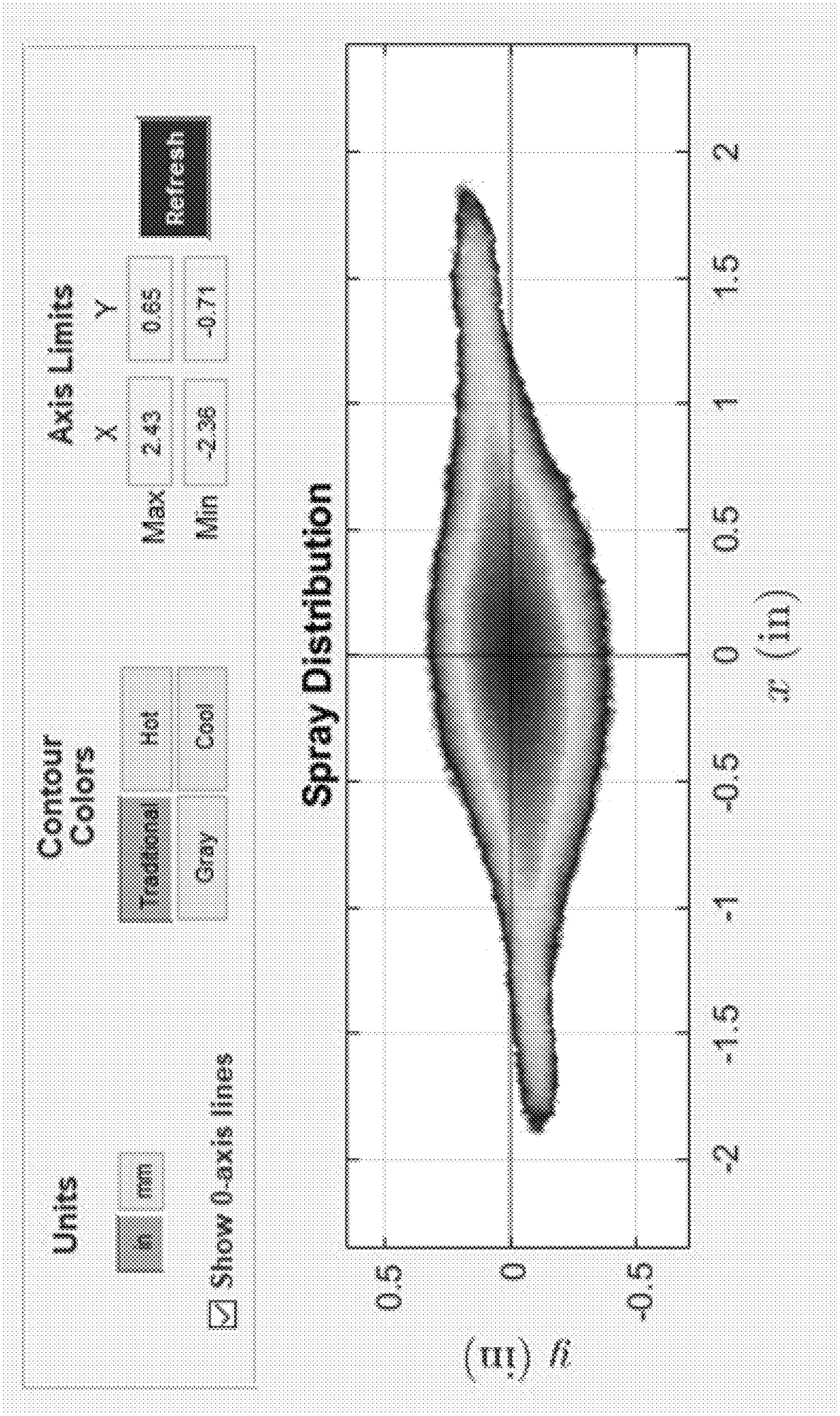

Turning to FIGS. 4A and 4B, two illustrative/exemplary views are provided of exemplary output (processed) image display interface, including an exemplary output image. In the illustrative example, the user interface supports user specification of units (inches/millimeters); contour (density) colors (including grey shades instead of color); and axis (image field of interest) limits. In the user interface depicted in FIG. 4B, a refresh button causes the system 100 to recalculate an output image based upon the selected parameters and display the image in the "Spray Distribution" field of the exemplary display. Thus, the "edit image" controls enable a user to configurably designate a part of an imported photographic image for further processing, analysis and display. In another illustrative output view, provided in FIG. 4A, the refresh button is not provided. Instead, the view updates the user/displayed view in response to a change in available displayed image (e.g. a new captured image, a user adjustment to a display parameter in an existing/displayed image, etc.).

Figure 5:
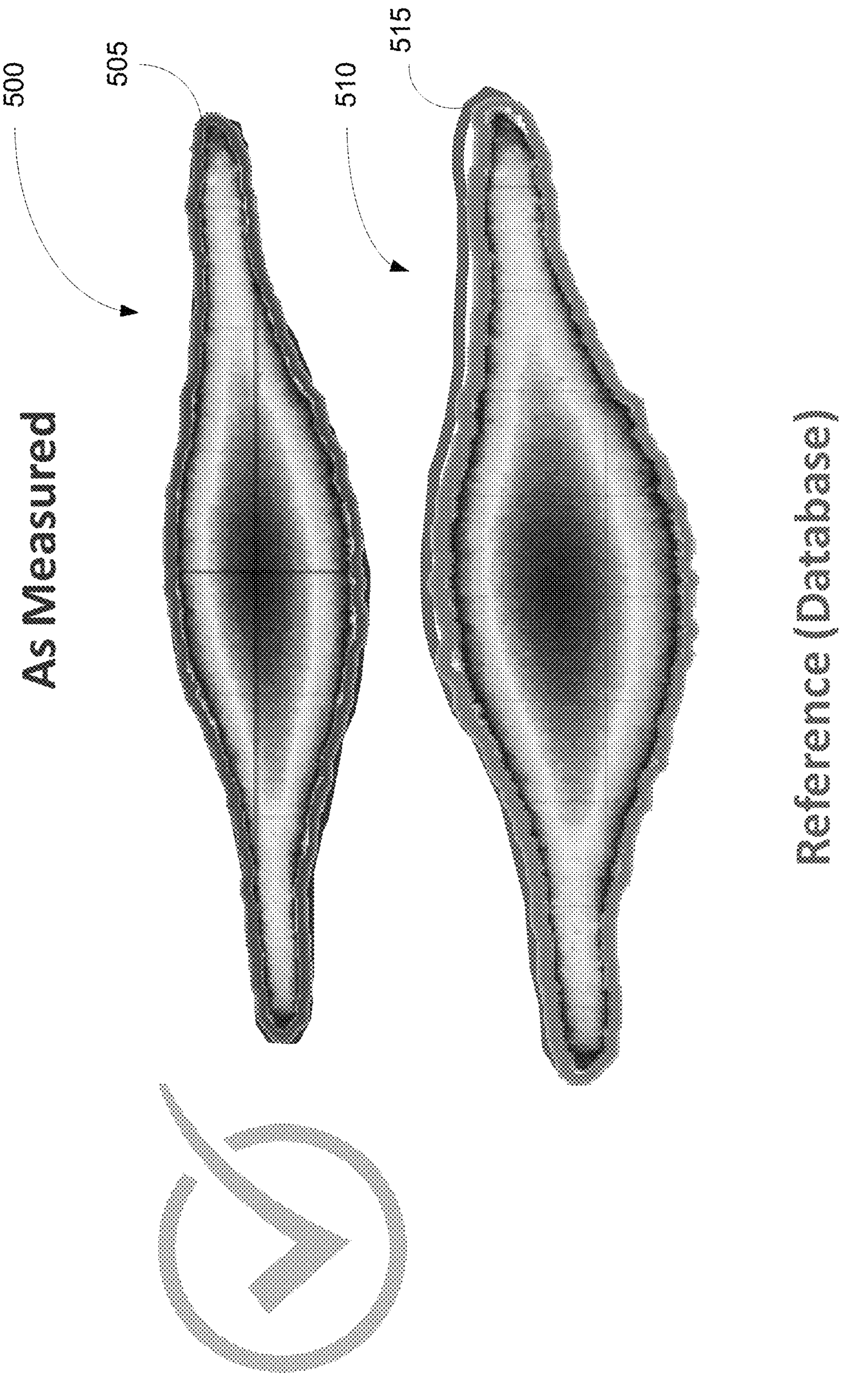
FIG. 5 is an exemplary view of a comparison rendered by the system and indicating a satisfactory observed spray pattern (in relation to a reference image)

Turning to FIG. 5, an illustrative example is provided of a type of analysis performed by the system 100 on a processed image (i.e. one that has been transformed into a graphical representation of overall coverage with displayed/distinguished regions of differing spray density. A measured spray pattern image 500 is depicted. The measured spray pattern image 500 includes an overall coverage area outline 505 that bounds a colorized (grey shaded) region that corresponds to the subregions of varying spray density. A reference spray pattern image 510 is depicted that is generated from a database (i.e. the expected pattern). The reference spray pattern image 510 includes an overall coverage area outline 515 that bounds a colorized (grey shaded) region that corresponds to the subregions of varying spray density. In the illustrative example, the measured image 500 is compared to the reference image 510 (either by the user or via a criteria-driven automated comparison executed on the smart phone 140 using the app program code executed by the processor. Since the coverage areas of the reference image 510 and the measured image 500 are substantially similar, the analysis renders a positive result (i.e. the spray application is properly configured).

Figure 6:
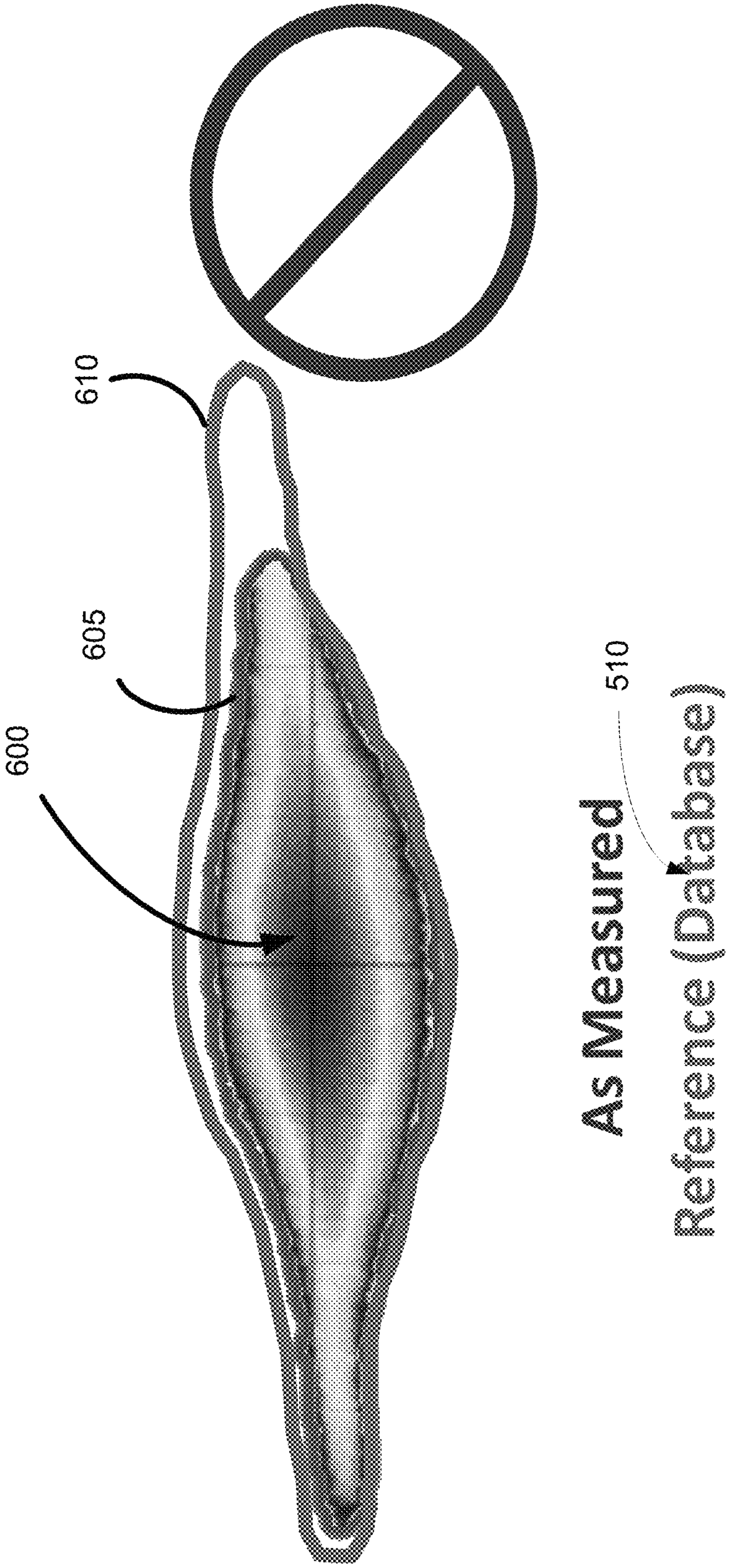
FIG. 6 is an exemplary view of a comparison rendered by the system and indicating a non-satisfactory observed spray pattern (in relation to a reference image)

On the other hand, FIG. 6 depicts a potential way of depicting a negative comparison result. In this case, a measured image 600 includes a measured coverage outline 605 that does not sufficiently track a reference outline 610. The outlines, by way of example, are carried out in an automated manner by the system 100. The programmed processor of the smart phone 140 detects the unacceptable deviation of the compared outlines and renders an negative result. In yet another view, the reference and measured images are compared and any resulting differences are represented by a two-dimensional colorized image depicted the differences where, for example, green means no difference, yellow means a slight difference, and red indicates a significant difference.

Figure 7:
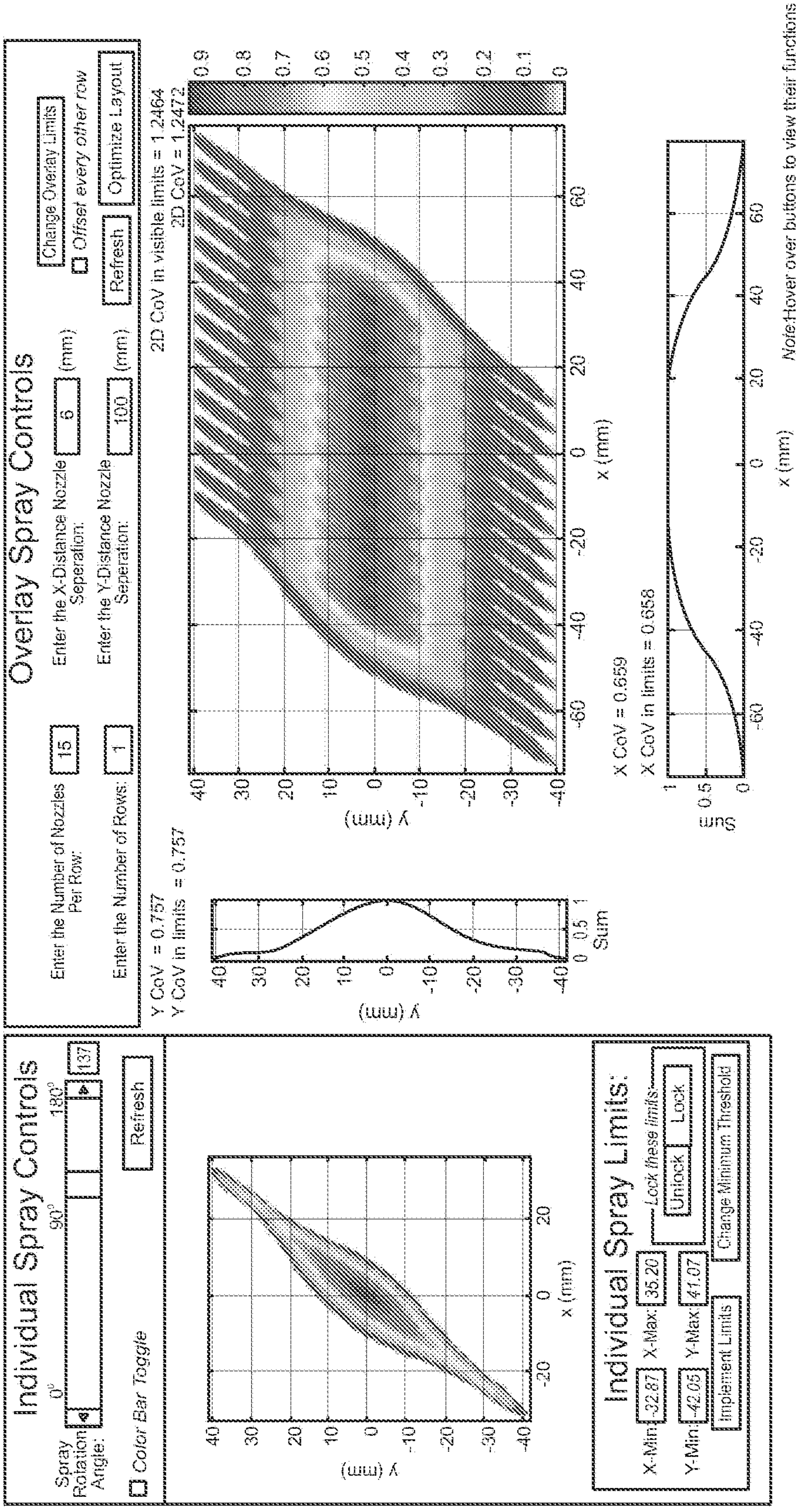
FIG. 7 is an exemplary view generated by combining multiple instances of a single observed spray pattern image.

Turning to FIG. 7, two exemplary views are provided. An "Individual Spray Controls" view depicts a scan image for a single spray nozzle acquired by the system 100. A rotation control enables a user to rotate the scan image up to 180 degrees. An "Individual Spray Limits" interface permits a user to define image limits for display/clipping of an input processes image. Turning to a "composing" feature, a composition image is depicted in the "Overlay Spray Controls" view. The composition image is created by a user specifying an input single nozzle image (e.g. the one depicted in the "Individual Spray Controls" view), specifying a number of nozzles (e.g. 15), a number of rows (e.g. 1), a gap between adjacent nozzles in a row (e.g. x=6 mm) and a column (e.g., 100 mm). In the illustrative example, the overlay composite image is a single composite row consisting of overlapping images generated from 15 nozzles separated by 6 mm. Additionally, two summation views (x-direction and y-direction) are provided for depicting accumulated (summed) spray density in the x and y directions, respectively.

Figure 8:
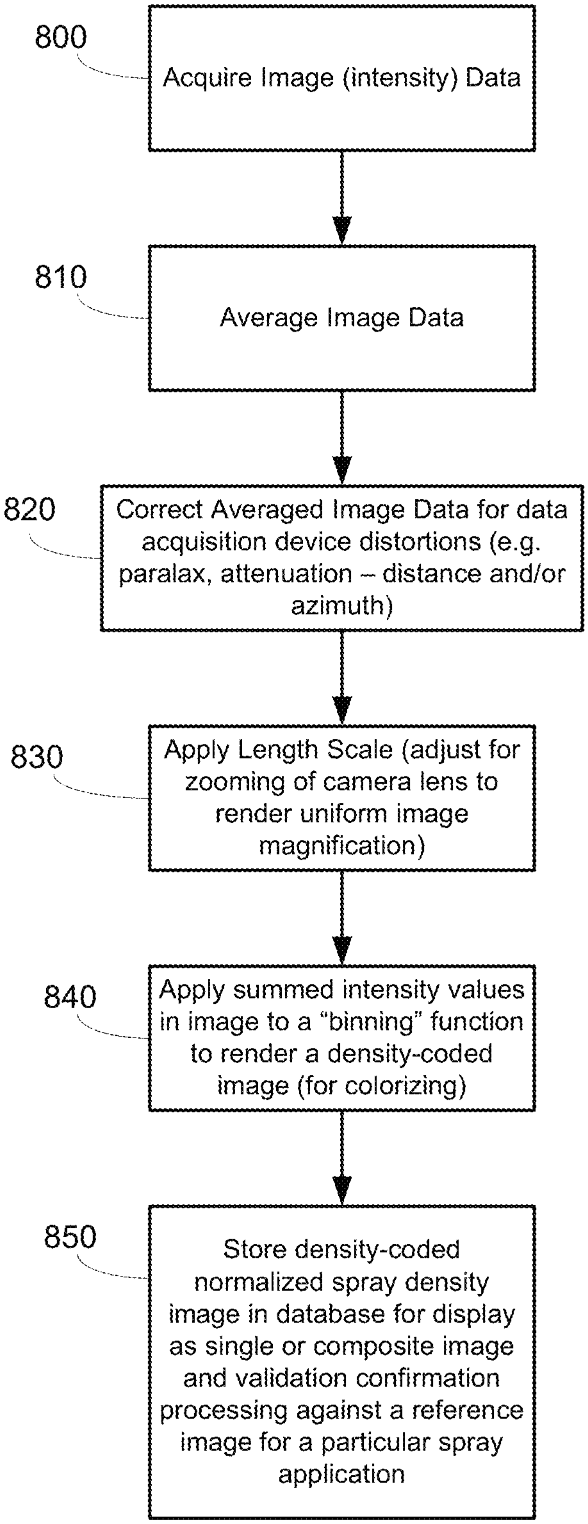
FIG. 8 is a flow diagram illustrating processes and data flow activities executed during an illustrative procedure for acquiring a spray pattern image data, processing the spray pattern image data, and rendering an image from the processed spray pattern image data in keeping with the invention.

Turning to FIG. 8, a flowchart summarizes the overall operation of the data acquisition and image processing/analysis operations performed by the system 100. During 800, an initial image data is acquired. In the illustrative system 100, a nozzle is positioned above the frame 110. As sprayed material passes from the nozzle and through the planar light pattern 150, an initial image data is acquired. As noted above, various forms of acquired images are contemplated including single static images (e.g. jpeg), a stream of live images (automatic high-repetition rate photo image function of smart phones), and movie image data (e.g. mpeg). The initial image (intensity) data includes red, green, and blue components. However, only the component corresponding to the color of the source laser (e.g. green) is used in later processing.

While a single image frame may be acquired during 800, it is preferable to acquire several frames and then average the pixel intensity values at corresponding locations across multiple image frames during 810. In the illustrative example, the "green" intensity component of corresponding pixel values is averaged across multiple frames.

During 820, the averaged image pixel intensity values rendered during 810 are corrected. In an illustrative example, the edges of the frame 110 are used to correct for parallax and any other distortions arising from the lens of the smart phone 140. The positions of the pixels are corrected in a two-dimensional space according to corrections needed to "straighten" the edges of the frame 110 (including ensuring the corners are 90 degrees). Additionally, intensity values are corrected, in an embodiment, to compensate for the decreased intensity of light based upon distance from the source and azimuthal angle position from the source.

During 830, the image is normalized by applying scalar value to positions on the image plane. The image scaling is intended to compensate for magnification/zooming during image acquisition by a user. In an illustrative example, a known length of one or more edges of the frame are used to determine a proper scaling value for normalizing the image data positions of the image data rendered by step 820.

During 840, intensity values of the various normalized intensity image data rendered during step 830 are applied to a binning function that assigns a discrete value in a limited range (e.g. 1 to 10) based upon the intensity value at the particular normalized pixel location. Thus, the output of 840 is a corrected, normalized, discrete density-coded image data.

During 850, the corrected, normalized, discrete density-coded image data is stored, for example, in a memory of the smart phone 140. Thereafter, a user selects the stored data for purposes of viewing in accordance with the various user interfaces depicted in FIGS. 4A, 4B, 4C, 5, 6, and 7. A user-selected color mapping scheme is thereafter used to render a colorized (or gray scale) image of the coverage area and density characteristics of the measured spray application.

Having described a single spray application arrangement, attention is now directed to a network-based arrangement that addresses a variety of technological challenges arising from operating the above-described spray scan monitor/analysis apparatus in a standalone arrangement. Notably, the networked arrangement described herein below facilitates remote access to acquired data, sharing of analytic resources, generalization of acquired data, rendering of generalized solutions based upon observed spray operations at a multitude of spray applications, etc.

Figure 9:
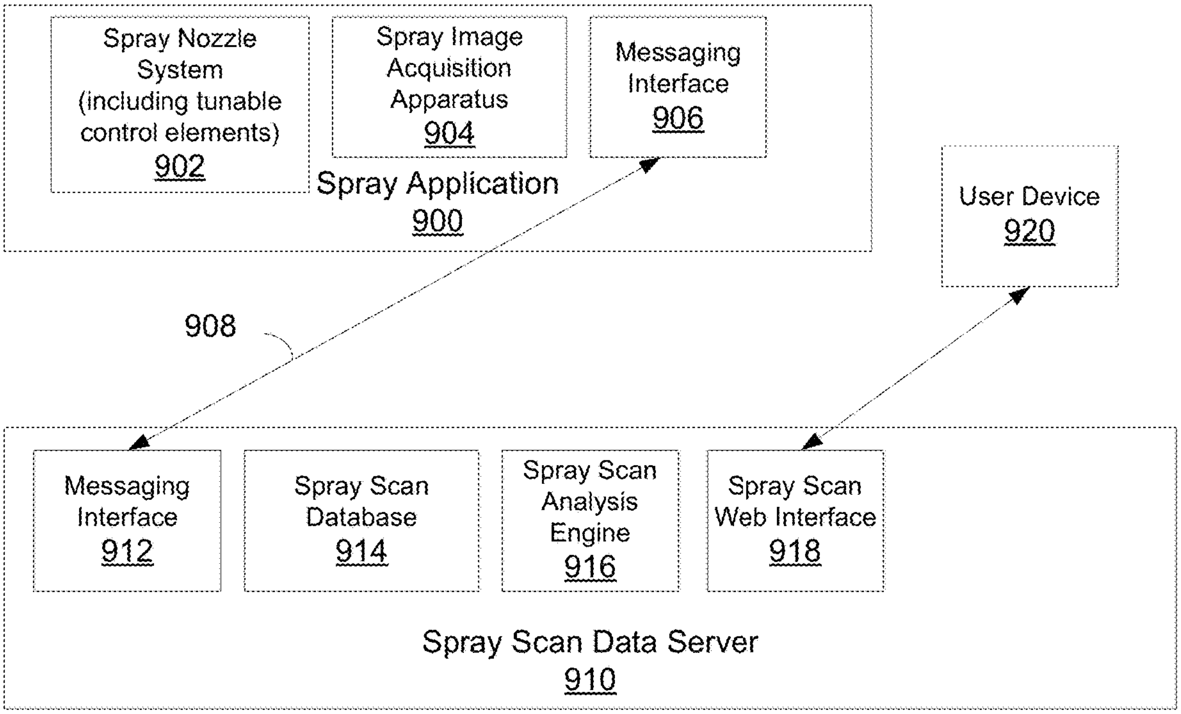
FIG. 9 is a simplified network diagram depicting an environment within which a networked solution is provided for monitoring and maintaining a multitude of networked spray applications incorporating spray quality sensor apparatuses having a network communication capability.

Turning to FIG. 9, a simplified network diagram depicts a network environment within which a networked solution is provided for accumulating spray status (image) data over time by a plurality of networked spray application instances that facilitates monitoring and maintaining a multitude of networked spray applications incorporating spray quality data acquisition arrangements having a network communication capability. A spray application 900 comprises at least a spray nozzle system 902 (including tunable control elements for adjusting operation of a physical spray nozzle) and a spray image acquisition apparatus 904. The spray image acquisition apparatus 904, of which examples are provided herein above, acquires a multitude of spray scan images over time. The spray image acquisition apparatus 904 is coupled to (or alternatively incorporates) a messaging interface 906 that processes one or more images rendered by the spray image acquisition apparatus 904 to render one or more image data messages that are sent via a network connection 908 (e.g. the Internet) to a spray scan data server 910. Processing (both acquired data and message data) is carried out by a processing component of the spray application 900 that may be, for example, a personal computer, an embedded processing system (e.g. RASPBERRY Pi), a controller, a smart phone, a tablet, etc.

The spray scan data server 910 incorporates a variety of services including: a messaging interface 912 that digests/builds messages from/for a image data sources, a spray scan database 914 that tables spray scan data acquired over time by a multitude of spray applications (e.g. spray image acquisition apparatus 904), a spray scan analysis engine 916, and spray scan Web interface 918 supporting a user dashboard graphical user interface (see FIG. 14 described herein below) that presents to a connected user device 920 via the Internet—or any other network connection supported by the Web interface 918—a variety of spray scan analytical data based upon compiled/processed data extracted from the spray scan database 914 and processed by the spray scan analysis engine 916. Additionally, the Web interface 918 supports receiving spray nozzle tuning requests from the connected user device 920—such tuning requests being forwarded to the spray nozzle system 902 via the messaging interfaces 912 and 906. The above-provided description is intended merely to identify structural/functional elements in a simplified form. It will be understood that the structural/functional elements of FIG. 9 may be implemented in a wide variety of actual network implementations, and the illustrative example is not intended to limit the implementations to particular physical connections/network nodes—as the functional elements can be implemented in a variety of physical implementations including a greater/lesser number of networked computing nodes.

Figure 10:
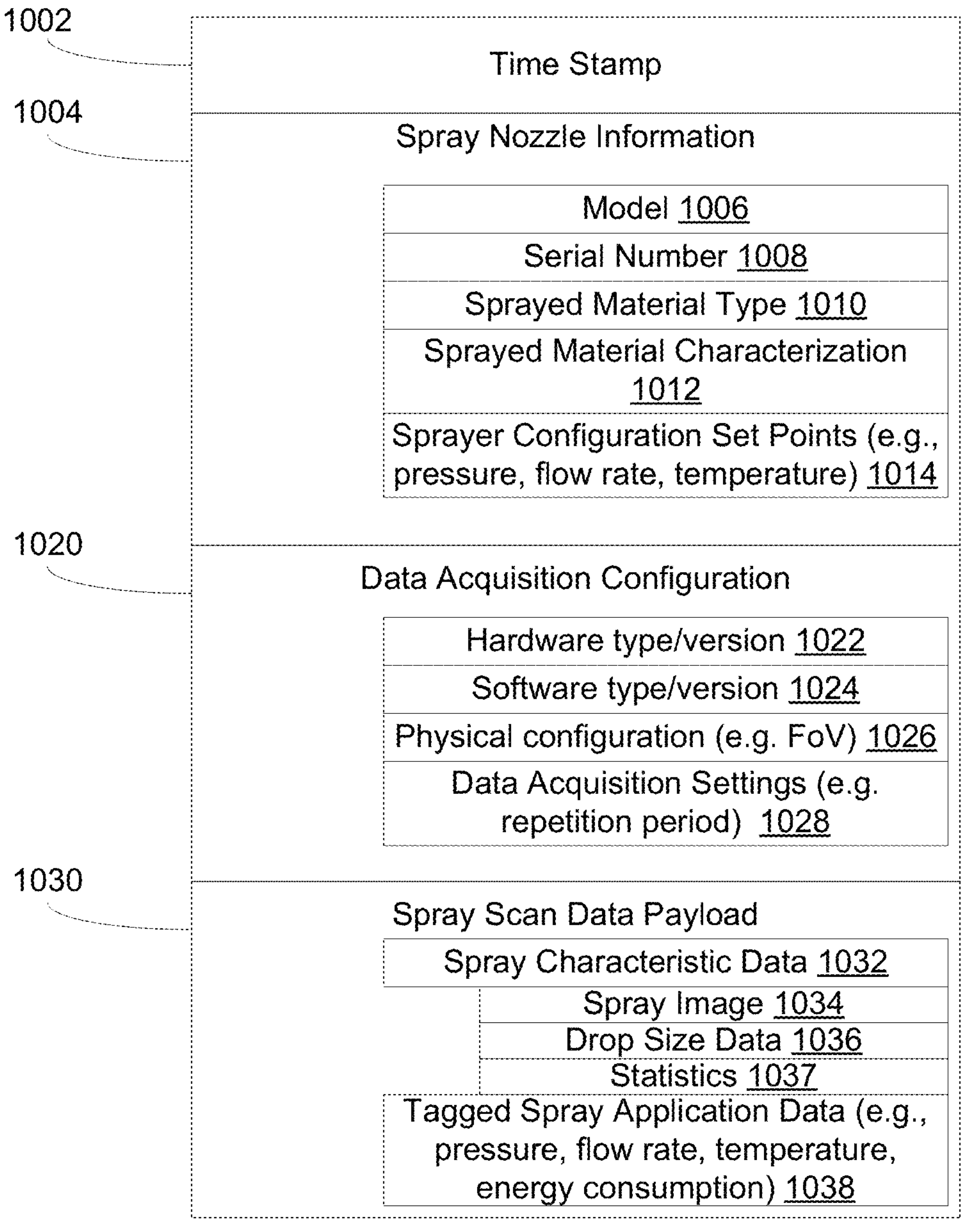
FIG. 10 is an exemplary data structure/aggregation summarizing exemplary message content provided by a remote spray application status monitor.

Having described an exemplary network arrangement for carrying out a networked solution for providing spray scan services for a multitude of spray applications, attention is directed to FIG. 10 that summarizes an exemplary data structure/aggregation summarizing exemplary message content provided by a remote spray application status monitor. In the illustrative example, a time stamp 1002 indicates a time associated with acquisition of spray data contained in a data message. Given the potential global reach of the networked arrangement, the time stamp 1002 stores a Coordinated Universal Time (UTC) time value so that all time values are synchronized to a single time standard (as opposed to a multitude of time zones). A spray nozzle information 1004 includes a multitude of information regarding a specific spray application instance including: a spray nozzle model 1006, a spray nozzle (unique) serial number 1008, a sprayed material type 1010, sprayed material characterization data 1012, sprayer configuration set points 1014 (e.g., pressure, flow rate, temperature, etc.). A data acquisition configuration 1020 including data acquisition hardware type/version 1022, data acquisition software type/version 1024, data acquisition physical configuration 1026 (e.g. field of view size—for scaling, orientation to image plane), data acquisition configuration/settings 1028 (e.g. data acquisition interval/repetition period, image calibration coefficients, sensor calibration coefficients), alarm trigger thresholds 1029 (including acceptable ranges for sensed parameters). By way of example, image calibration coefficients include: offset (angle) and magnification (zoom) values that the system uses to transform a raw image to a physically dimensioned image from a standardized perspective (camera angle). Thus, an input image that is 1000 pixels (x direction) by 1000 pixels (y direction) is transformed by image scaling factors to physical dimensions according to the following: 1 pixel(dx)=0.5 mm and 1 pixel(dy)=1.0 mm, to render a final physical dimension for the image field of: 500 mm (x direction) by 1000 mm (y direction). For sensor calibration, by way of example, values are specified to convert a received signal value (e.g. a voltage reading provided by a pressure sensor/transmitter). A pressure sensor/transmitter may be configured to render a current in a range from 4 to 20 milliamps that corresponds to a pressure range of 0 and 40 psi—with 4 milliamps corresponding to 0 psi and 20 milliamps corresponding to 40 psi. These are merely illustrative examples, and are not intended to limit the presently disclosed arrangement. Setting the calibration coefficients varies in accordance with various implementations and can be specified in software, setup files (e.g. spreadsheet files), determined by system software during an initialization (manual/automated), assessed in real time during operation of the system. The coefficients are transmitted with the data to ensure proper interpretation/handling of the raw data acquired/provided by the spray application 900.

With continued reference to FIG. 10, the exemplary message also includes a scan data payload 1030 including any of a variety of sensed/acquired/derived data relating to current operation status of a specific spray nozzle/spray application identified in the spray nozzle information 1004. A spray characteristic data 1032 includes, for example, a spray image 1034 acquired by a camera/fixture describes, by way of example, herein above. Other information of the characteristic data 1032 includes locally generated spray data such as, for example, drop size data 1036, and statistics 1037 derived (locally at the spray application) from the spray density distribution data of the spray image 1034 and the drop size data 1036.

Additionally, with continued reference to FIG. 10, the exemplary message, provided by a spray application via the messaging interface 906 to the spray scan data server 910, includes any of a variety of (tagged) spray application sensor data 1038 including: pressure, flow rate, temperature, and energy consumption.

The above-described message content is exemplary in nature, and is not limiting in the context of the present disclosure of a networked arrangement for monitoring/maintaining a multitude of spray applications (installations) via a networked arrangement comprising spray applications communicatively connected to the spray scan data server 910.

Figure 11:
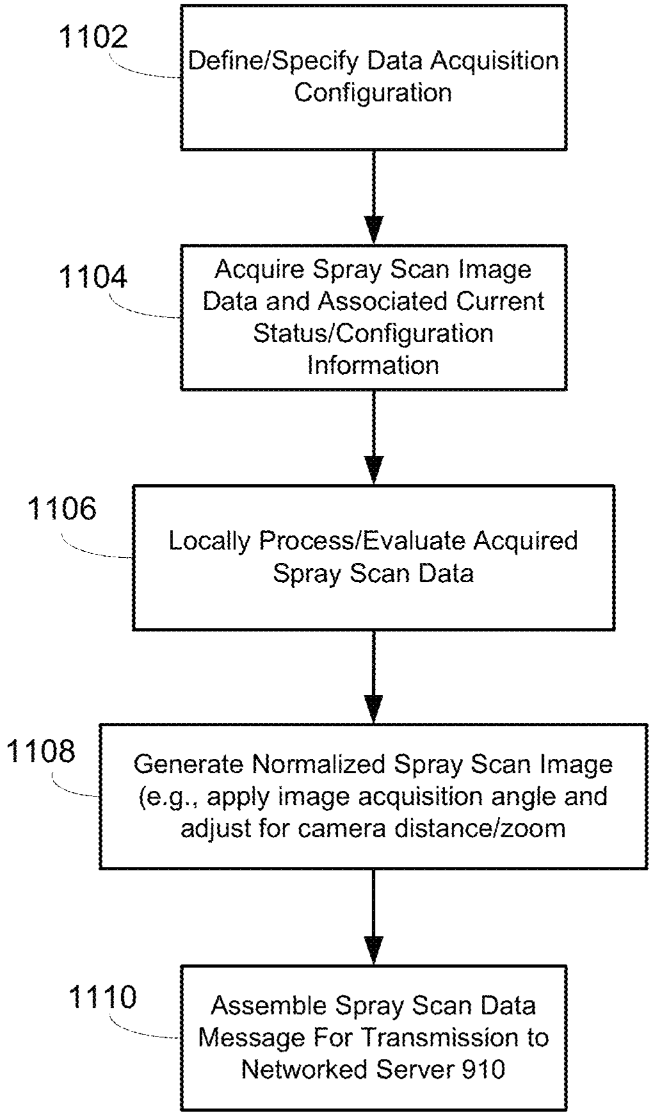
FIG. 11 is a flowchart summarizing spray quality data acquisition by/for a spray application.

Turning to FIG. 11, a flowchart summarizes spray quality data acquisition by/for a spray application. During 1102 a data acquisition configuration is defined for a spray application instance. By way of example, the configuration includes: calibration of image scan hardware, image scan repetition period, descriptive name of acquired data file, etc. Even more specifically, the spray application 900 supports a user interface that facilitates specifying data acquisition/message transmission setup/configuration information such as data file type, storage/import location, image calibration, data acquisition trigger (more below), image processing procedure preferences/details, display settings, export options, data transfer setup, data destination/transfer list. During 1102, the spray application 900 supports a user setting up additional data import sources, calibrations, and details (e.g., providing a current nozzle pressure from a live pressure sensor signal).

After the initial configuration/setup for generating messages, during 1104 the spray application acquires spray scan image and other related data (appropriately tagged for identification purposes when packaged for sending in a message(s) to the server 910) according to the configured repetition period and/or sensor-based trigger conditions. By way of example, data acquisition at the spray application 900 is triggered by detection of the spray within the laser-illumination field (e.g. by a sudden increase in light intensity seen by the camera in a particular region of a camera field of view). Alternatively/additionally, the spray scan image acquisition is configured periodically (e.g. every minute).

Additionally, during 1104, data is acquired in accordance with the configured repetition rate—that may differ from a repetition rate of the data sources (e.g. spray scan camera) that, for example, run at a repetition rate that exceeds a repetition period configured during 1102. In such case, intermediate data processing may be used to average/filter/discard extra data sets provided by acquisition hardware.

During 1106, the acquired scan image data is locally evaluated/associated with supplemental data provided by the spray application supplemental sensors (e.g. temperature, pressure, flow volume, etc.). The spray application 900 acquires an image or video frame (or multiple frames) of a spray pattern rendered by the spray nozzle system 902 as it is illuminated by a light source (e.g. laser) according to the data trigger settings. The spray application 900 processes the image of the spray cross-section into, for example, a 2D spray contour of spray concentration. The spray application 900 may then calculate details of interest about the spray pattern from the 2D contour such as: spray width, spray coverage area, Coefficient of Variation (CoV) across the spray, etc.

By way of a particular example, during 1106, the 2D spray contour data is saved (e.g. a .txt file) as a matrix of intensity values normalized from 0-to-1, where each value in the matrix represents an image intensity across the spray image, and where a header specifies a number of matrix values and spatial intervals. The spray image used to create the 2D contour is saved as a .png or .jpg. Calculated values (ex: spray width) and important values (ex: nozzle pressure) are saved to an additional data .txt file or within a common data file for all results. It is specifically noted that the data types provided/described herein, are examples. The described formats/types as well as other recognized formats, may be used, in addition to proprietary specialized formats for efficient data storage, efficient data transfer, or data security.

Figure 13:
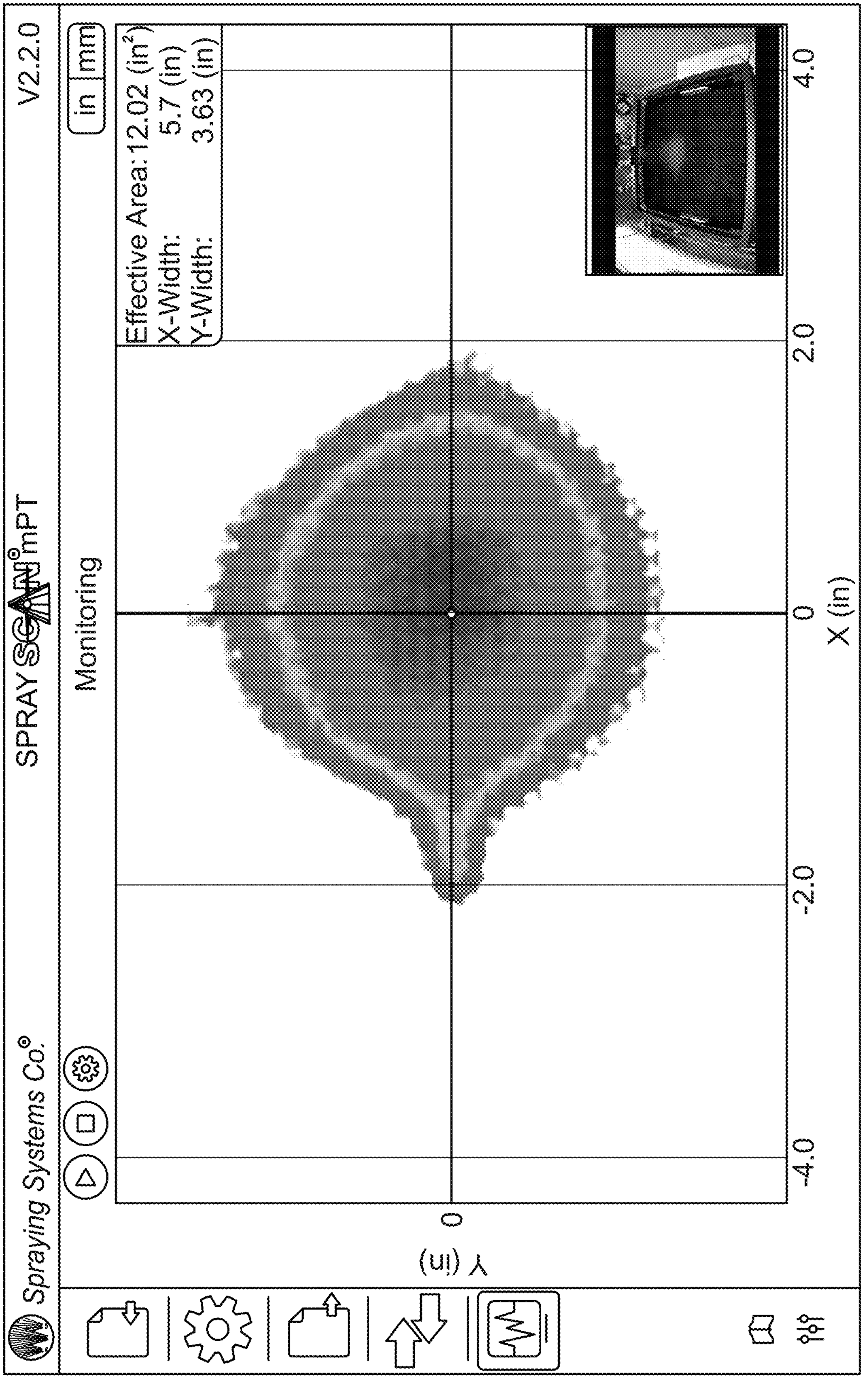
FIG. 13 is an exemplary graphical image constructed from image data acquired by/for a spray application.

During 1108, image acquisition angle information is applied to the image data to rotate/translate the initial scanned image to provide a normalized image perspective (e.g. centered/overhead view—depicted by way of example in FIG. 13).

During 1110, the spray application carries out local processing to render a message (see FIG. 10) for transmission to the server 910. The local system may thereafter immediately send the message, or alternatively, accumulate a plurality of such messages for packaging and sending as a group to the server 910. By way of example, data compiled for a single processed spray image, along with additional calculations and sensed values (ex: spray width and nozzle pressure), are transferred to the networked server 910 for tabling and subsequent presentation to remote users in the form of, for example, a dashboard graphical user interface for viewing and alarm presentation. By way of example, data transfer from the spray application to the spray scan data server 910 is initiated after data for a single run are acquired and compiled. Alternatively, results for multiple (e.g. 10) runs are compiled and saved, and then transferred in a single larger data transfer after establishing an on-demand network connection to the server 910.

It is generally noted that the locally processed/compiled data provided by the spray application 900 may be received and maintained in a variety of ways. In accordance with the examples described above, processed spray scan data are transferred to the server 910 for tabling/archiving/collaborative processing (across potentially multiple spray applications having similar configurations—for statistical comparisons). By way of example, the spray application 200 transfers the following: a 2D spray distribution, a spray width, and a nozzle pressure data. Thus, in accordance with the illustrative examples herein, the processed data may be viewed locally (at the spray application), reviewed at the local network server—e.g., via the dashboard interface (see FIG. 14) either at the server 910 or via a network-connected client such as the user device 920 (e.g., a smart phone, tablet, notebook, workstation, etc.). The dashboard view of FIG. 14 is an exemplary, and desirable, manner of reviewing the acquired/processed scan image data provided by the spray application 200 for both monitoring and control of the spray nozzle system 902 from virtually any local/remote location.

Figure 12:
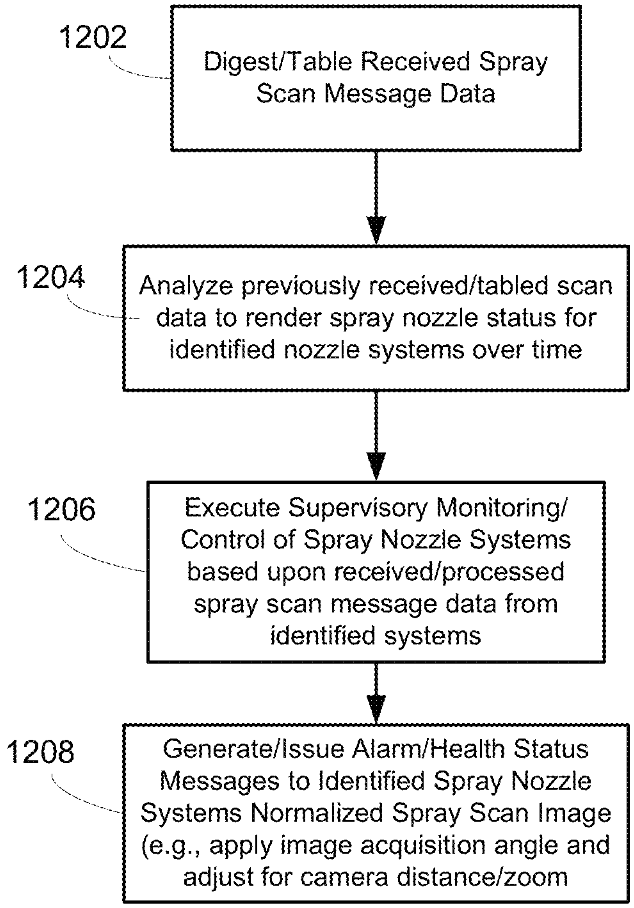
FIG. 12 is a flowchart summarizing data transmission (from a spray application to a server node via messaging over a network connection.

FIG. 12 is a flowchart summarizing a set of exemplary operations carried out by the server 910 based upon messages provided by identified spray applications. During 1202, the server 910 performs operations to digest the content of received messages from identified spray applications and tables the resulting data for further analysis and presentation to requesting users.

Figure 14:
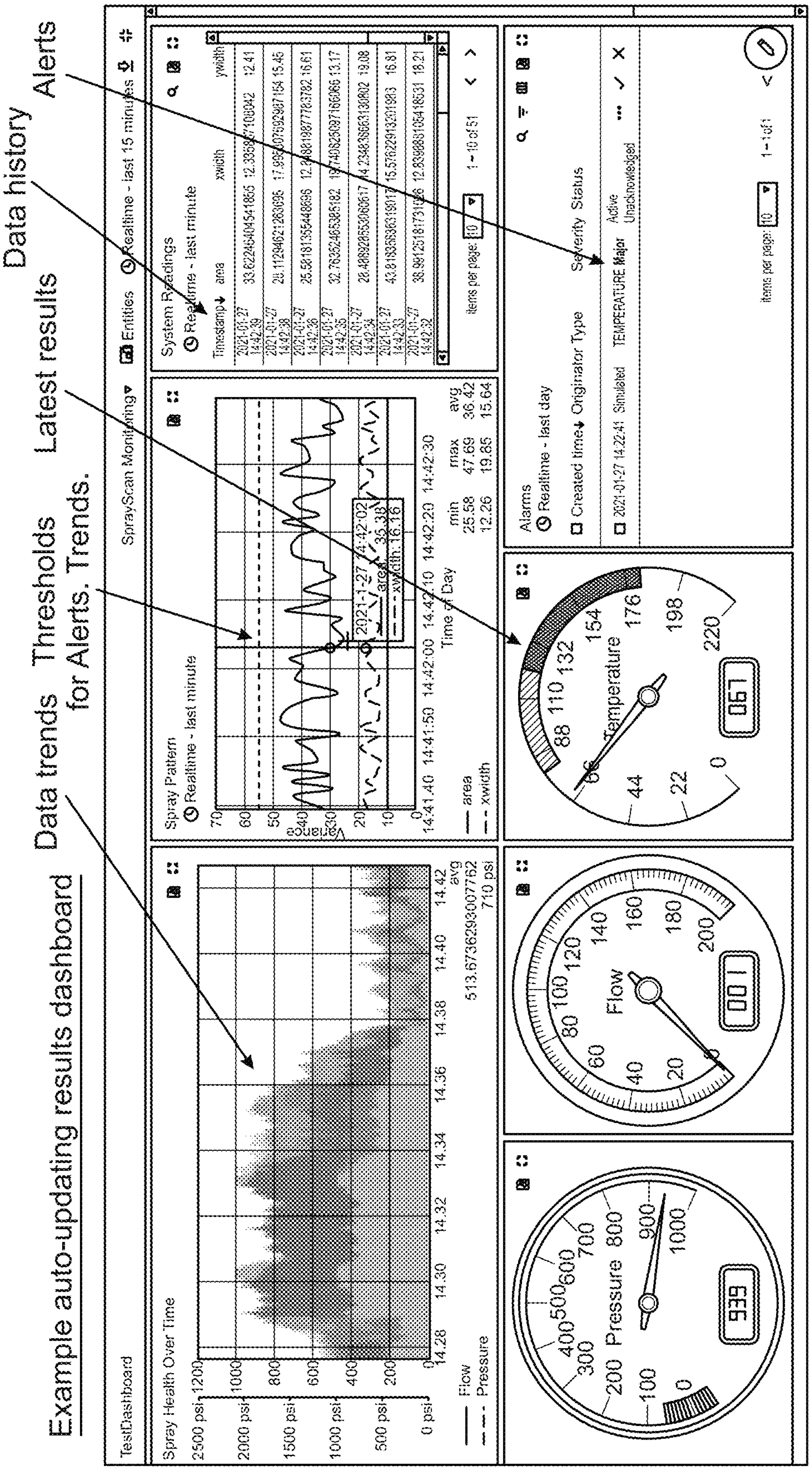
FIG. 14 is an exemplary user interface displaying a multi-component dashboard user interface providing a multitude a spray quality/status data over time accumulated by a networked server via messages sent by/for a particular spray application.

During 1204 the server 910 analyzes previously tabled data (from messages received by the server 910 from each of a multitude of registered/configured spray applications processed during 1202) to render/store a variety of status information compiled over an extended time period via a user interface such as an exemplary user dashboard depicted in FIG. 14.

During 1206 the server 910 carries out a variety of supervisory/monitoring operations with respect to the registered spray applications based upon the received/analyzed spray scan image and supplemental data previously received and analyzed during 1202. Examples of such analyses include, for example, trending and threshold (low and/or high) comparison analyses.

Monitoring/analyzing the data values both instantaneously (threshold comparisons) and over time (trending) facilitates detecting degraded operation (potentially addressed by remedial tuning and/or maintenance) and/or avoiding an impending failure. As such, the operations performed during 1206 may involve processing of received data, which could lead to modification or tuning of the spray system. Furthermore, threshold or trend analyses are carried out by the server 910 to facilitate system adjustment decision-making and remedial operations based on the data. Example adjustments include: nozzle pressure/flow/other nozzle control parameter (duty cycle, air pressure, applied voltage, etc), spray distance to target, system line speed, nozzle traverse path with a robotic arm, process temperature, spray material/chemistry, spray material viscosity, spray solid particle size, etc.

There are many nozzle operation parameters that may be adjusted, under control of the server 910 (including controllers associated therewith) to improve and/or maintain a process quality despite changes in the spray nozzle system physical properties. For example, if a spray material tends to gradually clog a nozzle over time, the server 910 may prescribe increasing an operating pressure of a feed line to maintain a desired flow rate. However, based on the spray pattern, a clogged nozzle may also have a smaller spray angle and coverage, in this scenario it may be more beneficial to the spray application 900 for the server 910 to command a position controller to increase a spray nozzle-to-target distance to allow the pattern to be wider on the target until the nozzle can be cleaned.

As will be appreciated by those skilled in the art, there are a wide variety of process parameters that may be controlled and tuned to maintain an desired process output, even if the spray details change. For example, if the nozzle flow rate is determined to have decreased, then the production line speed could be reduced in order to maintain the same spray product volume deliver per square foot of the target substrate. Similarly, a robotic arm could be traversed in an altered pattern to maintain complete or accurate coverage on the target surface despite changed spray pattern shape, size, or location relative to the spray nozzle.

During 1208 the server 910 carries out an alarm/health reporting operation based upon the results of the analyses carried out during 1206. Alarms are, for example, based on thresholding of values uploaded to a dashboard (see e.g., FIG. 14). Simple high/low limits (i.e., a range) are used to specify acceptable operation for any of a variety of monitored process parameters. By way of example, the server 910 activates a process alarm (potentially tied to a physical alarm) in accordance with a determination that a spray pattern width is not within a specified range specified by a maximum value and a minimum value for the monitored width. Alternatively, an alarm condition may be tied to a percentage (or percentages in the case of a high/low limit) of an originally measured value. In addition to corrective actions described herein above, the server 910 may activate visual, virtual, or other types of alarms or warnings that are presented to the user, control electronics, etc. to indicate that an identified parameter(s) has moved outside of the original/acceptable/ideal range. Alarms are displayed on screen, sent to a user's workstation, sent to a mobile device, used to activate a building alarm, etc.

During 1210 the server 910, in particular configurations where active control is authorized by the individual spray application, issues a control command affecting a change to the operation of the spray application. The type of command can be any of a variety of remedial/control operations including: tuning operation of the spray application (modifying an input variable such as actuation frequency, fluid pressure, fluid mix, fluid temperature, etc.); issuing an instruction to an operator to perform a maintenance action; shutting down the application, etc.

FIG. 14 is an exemplary user interface displaying a multi-component dashboard user interface providing a multitude a spray quality/status data over time accumulated by a networked server via messages sent by/for a particular spray application. The dashboard graphical user interface includes a plurality of alarms including, for example, when a nozzle pressure at the spray nozzle system 902 falls outside a specified range (including both critical low and high limits). The dashboard depicted in FIG. 14 also provides a spray width value to adjust the nozzle pressure (e.g. if the spray width decreases below a desired value, pressure is increased, in accordance with a corrective pressure adjustment scheme, to maintain a desired spray width (within a specified range). By way of example, a trigger is activated that indicates a pressure was increased to counter a lowered spray width, and indicates the spray nozzle should be serviced. By way of a particular example, a reduced order model is used to read nozzle pressure, spray width, and CoV values and use this combination of parameter values to predict/forecast failures, prescribe process adjustments for efficiency or improvement, and avoid process failures until the process run is completed. Aggregate data analysis is used on large sets of the reported data to identify trends for obvious or non-obvious correlations between process and measured values and to assist in data interpretation—thereby facilitating data-driven process/operation control improvements over extended periods of time without the necessity for monitoring personnel to be physically present at the spray application 900.

In the illustrative example of FIG. 14, a plurality of "fields" are presented corresponding to a variety of provided graphical representations of data to enhance the communication of spraying system status to a human observer of the spray application 900. These human-machine interface (HMI) features are described herein below.

A data trends visual feature depicts a time series of values for a plurality of data variables. For example, a pressure process variable may slowly decrease as a nozzle becomes clogged, but a sudden change would indicate a more abrupt change in the nozzle's operation. Such change is readily observed by a histogram showing the process pressure over time. Similarly for a spray coefficient of variation over the spray pattern area process variable, if this value slowly increases then the spray is slowly becoming less uniform, and a sudden increase would indicate a notable problem with the nozzle. The trendlines depicted by histogram features demonstrate the 'normal' variation of parameters which will be useful when setting, or adjusting an 'acceptable' level for alarms or tunable controls.

A threshold for alerts visual feature depicts limits for specific parameters, with a visual indicator of how close to the limits these values are becoming. Such visual feature enables a human manager to readily observe/head off an impending alarm state, or make a decision to allow a process to continue to run even if the threshold is slightly outside of the limit level, but likely still ok until expected downtime or scheduled maintenance.

A latest results visual feature provides a visual presentation of a live, or near live, view of specific process variables.

A data history visual feature provides a graphical depiction of a log or archive or some or all previously transmitted and/or displayed results.

An alerts visual feature provides a highlighted area where alert-level events are logged and can be reviewed.

It will be appreciated that the foregoing description relates to examples that illustrate a preferred configuration of the system. However, it is contemplated that other implementations of the invention may differ in detail from foregoing examples. As noted earlier, all references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A spray application management arrangement comprising:
- a spray scan data server; and
- a spray application comprising:
  - a spray nozzle monitoring apparatus that renders optical image data indicative of a current status of a spray nozzle system; and
- a first network interface that sends a message comprising a data payload comprising information corresponding to the optical image data to the spray scan data server, wherein the spray scan data server comprises:

a second network interface for receiving the message;

a spray scan database for storing the information corresponding to the optical image data; and a spray scan data analysis engine that processes the information corresponding to the optical image data.

2. The arrangement of claim 1, wherein the spray scan data server further comprises a spray scan web interface supporting a remote dashboard human-machine interface (HMI) presented on a remote monitoring device.

3. The arrangement of claim 1 wherein the spray nozzle monitoring apparatus is a spray pattern imaging apparatus that renders a an image of a spray pattern rendered by the spray nozzle system, and wherein the information corresponding to the optical image data is spray pattern image data.

4. The arrangement of claim 3 wherein the spray pattern imaging apparatus comprises:

a frame having a set of known aspects corresponding to a first dimension and a second dimension within a first plane; and a light source generating a planar light pattern within a substantially same plane as the first plane of the frame;

wherein the set of known aspects facilitate both correcting an image distortion and a scaling of a spray pattern image generated by an image acquisition device during a spray application by a nozzle positioned in a physical relationship with the planar light pattern such that spray particles emitted from the spray nozzle pass through the planar light pattern while an initial image is acquired by the image acquisition device.

5. The arrangement of claim 1, wherein the spray scan data server is further configured to provide, via a network interface, a control command affecting operation of the spray nozzle system.

6. A spray scan data server configured to manage information corresponding to optical image data rendered by a spray nozzle monitoring apparatus of a spray application that comprises a spray nozzle monitoring apparatus that renders the optical image data indicative of a current status of a spray nozzle system and a first network interface that sends a message having a data payload including the information corresponding to the optical image data, the spray scan data server comprising:

a second network interface for receiving the message;

a spray scan database for storing the information corresponding to the optical image data; and a spray scan data analysis engine that processes the information corresponding to the optical image data.

7. The spray scan data server of claim 6, wherein the spray scan data server further comprises a spray scan web interface supporting a remote dashboard human-machine interface (HMI) presented on a remote monitoring device.

8. The spray scan data server of claim 6, wherein the spray scan data server is further configured to provide, via a communication interface, a control command affecting operation of the spray nozzle system.

9. The spray scan data server of claim 8 wherein the communication interface is a network interface.

10. The spray scan data server of claim 6, wherein the spray nozzle monitoring apparatus is a spray pattern imaging apparatus that renders an image of a spray pattern rendered by the spray nozzle system, and wherein the information corresponding to the optical image data is spray pattern image data.

11. The spray scan data server of claim 10, wherein the spray pattern imaging apparatus comprises:

a frame having a set of known aspects corresponding to a first dimension and a second dimension within a first plane; and a light source generating a planar light pattern within a substantially same plane as the first plane of the frame;

wherein the set of known aspects facilitate both correcting an image distortion and a scaling of a spray pattern image generated by an image acquisition device during a spray application by a nozzle positioned in a physical relationship with the planar light pattern such that spray particles emitted from the spray nozzle pass through the planar light pattern while an initial image is acquired by the image acquisition device.

12. A method, carried out by a spray scan data server configured to manage information corresponding to optical image data rendered by a spray nozzle monitoring apparatus of a spray application that comprises a spray nozzle monitoring apparatus that renders the optical image data indicative of a current status of a spray nozzle system and a first network interface that sends a message having a data payload including the information corresponding to the optical image data, the method comprising:

receiving the message via a second network interface;

storing, in a spray scan database, the information corresponding to the optical image data; and rendering, by a spray scan data analysis engine, analytical data corresponding to the information corresponding to the optical image data rendered by the spray nozzle monitoring apparatus.

13. The method of claim 12, further comprising providing, via a spray scan web interface, a remote dashboard human-machine interface (HMI) presented on a remote monitoring device.

14. The method of claim 12, wherein the spray scan data server is further configured to provide, via a network interface, a control command affecting operation of the spray nozzle system.

15. The method of claim 12, wherein the spray nozzle monitoring apparatus is a spray pattern imaging apparatus that renders an image of a spray pattern rendered by the spray nozzle system, and wherein the information corresponding to the optical image data is spray pattern image data.

16. The method of claim 15, wherein the spray pattern imaging apparatus comprises:

a frame having a set of known aspects corresponding to a first dimension and a second dimension within a first plane; and a light source generating a planar light pattern within a substantially same plane as the first plane of the frame;

wherein the set of known aspects facilitate both correcting an image distortion and a scaling of a spray pattern image generated by an image acquisition device during a spray application by a nozzle positioned in a physical relationship with the planar light pattern such that spray particles emitted from the spray nozzle pass through the planar light pattern while an initial image is acquired by the image acquisition device.

* * * * *